(12) United States Patent
Lynn et al.

(10) Patent No.: US 8,157,468 B2
(45) Date of Patent: Apr. 17, 2012

(54) PIVOT CONNECTION

(76) Inventors: Tim Lynn, South Australia (AU);
Graham Davies, South Australia (AU);
Daniel Flynn, South Australia (AU)

( * ) Notice: Subject to any disclaimer, the term of this patent is extended or adjusted under 35 U.S.C. 154(b) by 554 days.

(21) Appl. No.: 11/718,313

(22) PCT Filed: Oct. 31, 2005

(86) PCT No.: PCT/AU2005/001674
§ 371 (c)(1),
(2), (4) Date: Jan. 23, 2009

(87) PCT Pub. No.: WO2006/045160
PCT Pub. Date: May 4, 2006

(65) Prior Publication Data
US 2009/0123223 A1 May 14, 2009

(30) Foreign Application Priority Data
Oct. 29, 2004 (AU) ................................ 2004906227

(51) Int. Cl.
*G02B 7/182* (2006.01)
(52) U.S. Cl. ........................................ 403/152; 359/847
(58) Field of Classification Search ................. 403/119, 403/121, 150, 152, 159, 289; 359/873, 874, 359/877; 15/144.1
See application file for complete search history.

(56) References Cited

U.S. PATENT DOCUMENTS

| 3,564,978 | A | * | 2/1971 | Flitz ................................. 92/187 |
| 4,114,988 | A | * | 9/1978 | Enomoto ....................... 359/874 |
| 4,281,899 | A | * | 8/1981 | Oskam ........................... 359/876 |
| 4,477,150 | A | * | 10/1984 | Usami et al. .................. 359/874 |
| 4,585,200 | A | * | 4/1986 | Fisher ............................ 248/487 |
| 4,876,948 | A | * | 10/1989 | Yasukawa et al. ................ 92/99 |
| 4,915,493 | A | * | 4/1990 | Fisher et al. .................. 359/874 |
| 5,458,365 | A | * | 10/1995 | Rogers et al. .............. 280/728.3 |
| 5,467,230 | A | * | 11/1995 | Boddy et al. .................. 359/874 |
| 5,838,507 | A | * | 11/1998 | Boddy et al. .................. 359/877 |
| 5,876,141 | A | * | 3/1999 | Hsu ................................ 401/207 |
| 5,969,891 | A | * | 10/1999 | Otenio et al. ................. 359/871 |
| 6,942,415 | B2 | * | 9/2005 | Whitton et al. ................. 403/27 |
| 7,231,684 | B2 | * | 6/2007 | Post .............................. 15/220.1 |
| 2005/0034260 | A1 | * | 2/2005 | Post ............................. 15/220.1 |

FOREIGN PATENT DOCUMENTS
DE 2447688 A * 4/1976
* cited by examiner

*Primary Examiner* — Joshua Kennedy
(74) *Attorney, Agent, or Firm* — Reising Ethington P.C.

(57) ABSTRACT

A pivot connection comprising a substantially cylindrical head (14) to be pivotally located into a socket, at least one first surface on the socket that engages one side of the outer surface of the cylindrical head (14), and second surfaces that engage the ends of the cylindrical head (14) on a side substantially opposite to the at least one first surface to thereby retain the cylindrical head (14) within the socket.

6 Claims, 3 Drawing Sheets

PIVOT CONNECTION

This invention relates to a pivot connection and in particular to the means of assembling the pivot connection.

BACKGROUND OF THE INVENTION

This invention addresses the design of a pivot connection which enables easy connection particularly in relation to pivot connection members moulded from resilient or plastic material.

There are numerous examples where there is a requirement for a component to be pivotally attached to another member.

It is therefore the aim of this invention to provide such a pivot connection and to provide a pivot connection which is of a simplified design that is easy to assemble.

SUMMARY OF THE INVENTION

In one aspect therefore, a pivot connection comprises:
a substantially cylindrical head to be pivotally located, a socket into which said cylindrical head pivotally locates, at least one first surface on said socket that engages one side of the outer surface of said cylindrical head, and second surfaces that engage the ends of said cylindrical head on a side substantially opposite to said at least one first surface to thereby retain said cylindrical head within said socket.

In this arrangement, shafts or other articles that require a pivotal attachment may be secured or moulded to the cylindrical head. Preferably, the first surfaces locate and engage one side of the outer surface of the cylinder and preferably U-shaped recesses are provided at either end of the socket within which the cylindrical head locates to support either end of the cylindrical head.

Preferably, one end of the socket may be resiliently flexible to allow insertion of the cylindrical head whereby the resiliently flexible portion deflects sufficiently to allow clearance for the cylindrical head to move into position. Further, the cylindrical head may have ramped surfaces which assist in location of the cylindrical head in to the socket.

In order to fully understand the invention, a preferred embodiment will be described. However, it should be realised that the invention should not be restricted to the combination of features shown in the preferred embodiment.

The preferred embodiment is described in relation to a motor mechanism for controlling the position of an external mirror of a motor vehicle rear vision mirror. This is for ease of description but it will be realised that the invention will have other applications.

BRIEF DESCRIPTION OF THE DRAWINGS

This embodiment is illustrated in the accompanying drawings in which.

DETAILED DESCRIPTION

Figure 1:
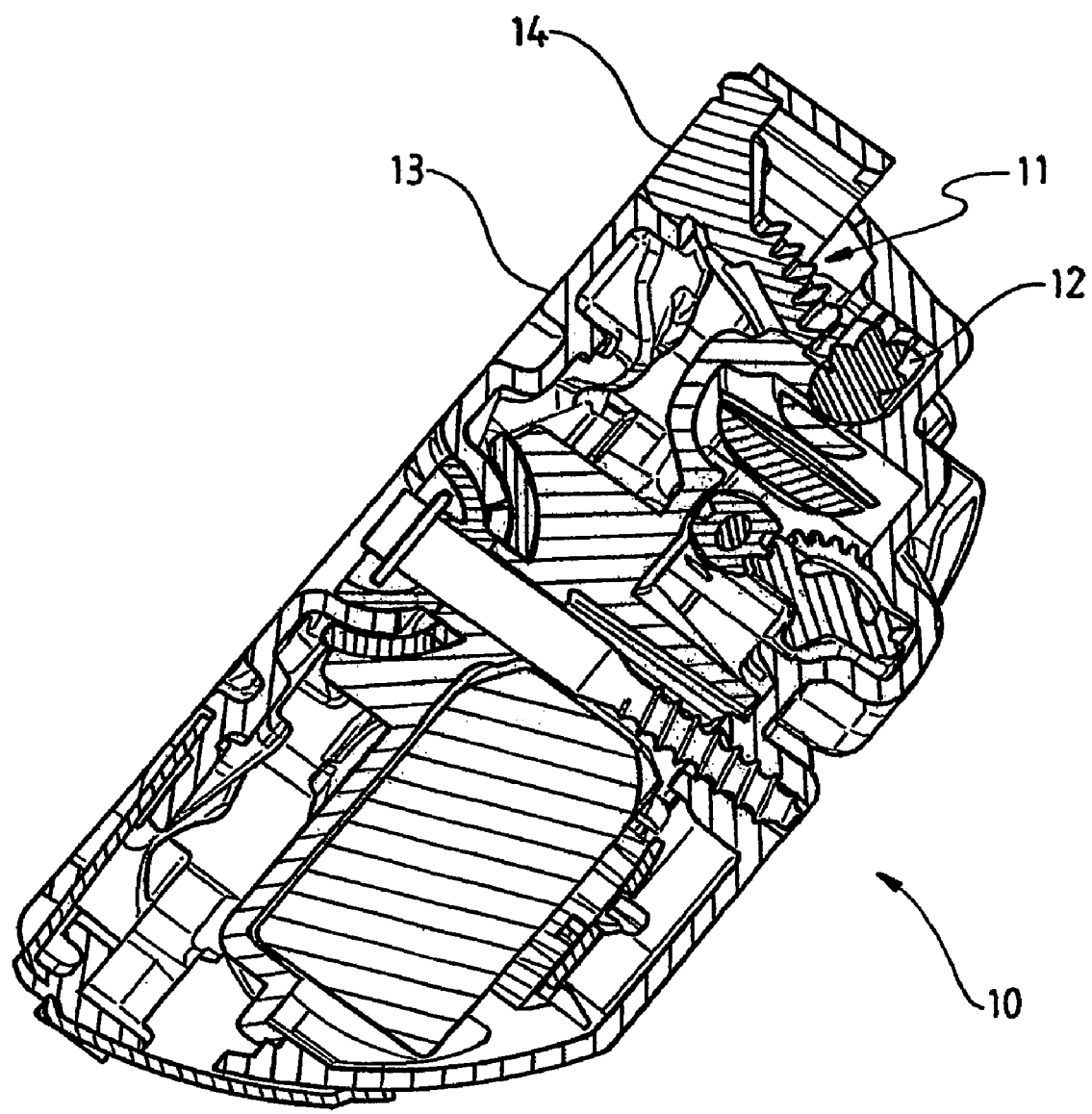
FIG. 1 shows a cross section view of a motor mechanism.

The motor mechanism 10 shown in FIG. 1 comprises an electrically driven rack 11 and pinion 12. The rack 11 is pivotally attached to a cover plate 13 via a cylindrical head 14. Electrical operation of the motor mechanism 10 causes movement of the rack 11 via rotation of the pinion 12. This acts to orientate the cover plate 13 in the required position. The rack 11 is required to be pivotally connected to the cover plate 13 in order to achieve this movement. This pivotal connection is via the cylindrical head 14 of the rack 11 and a socket 15 in to which the cylindrical head 14 locates.

Figure 2:
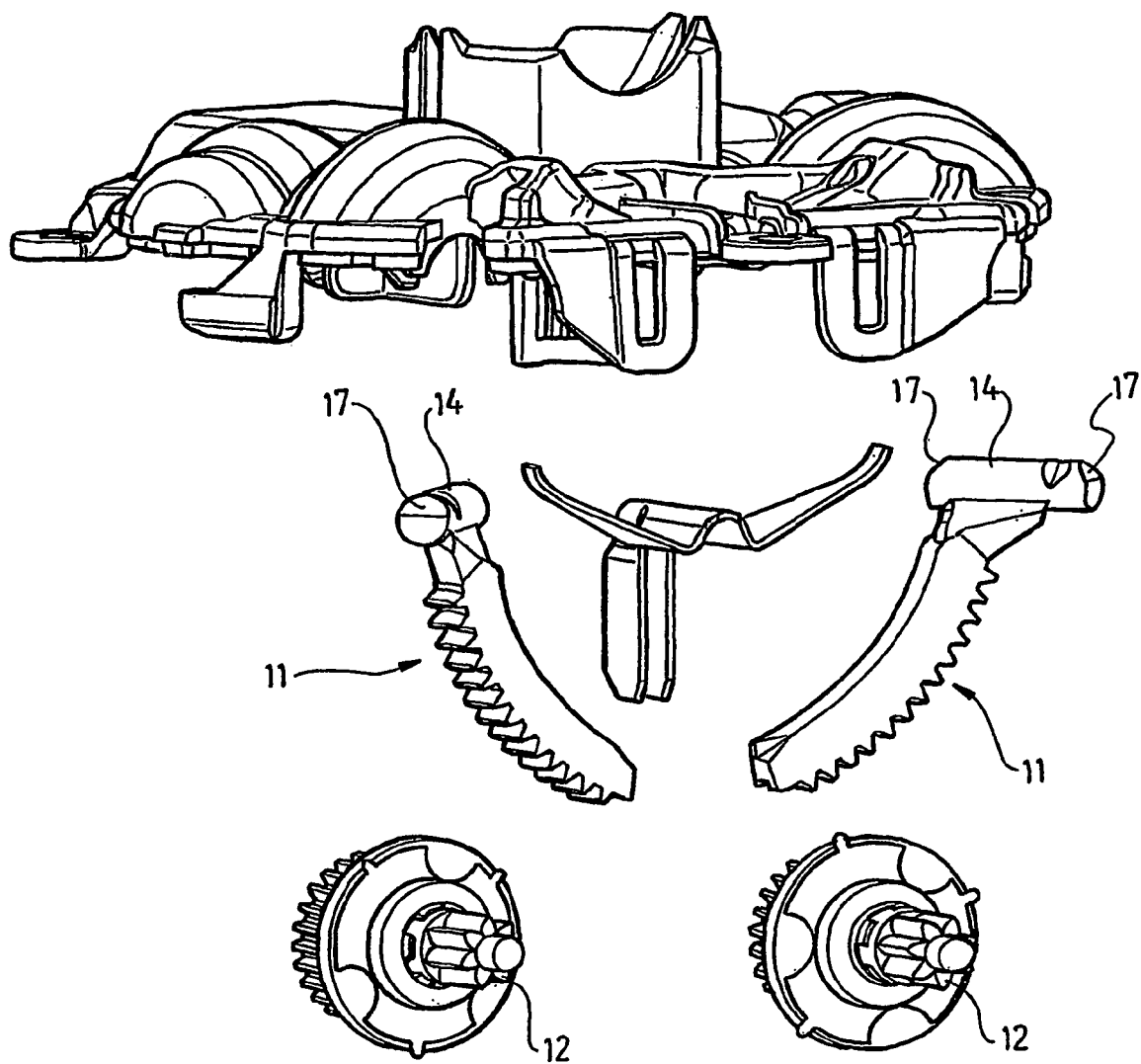
FIG. 2 shows an exploded view of selected components of a motor mechanism.
Figure 3:
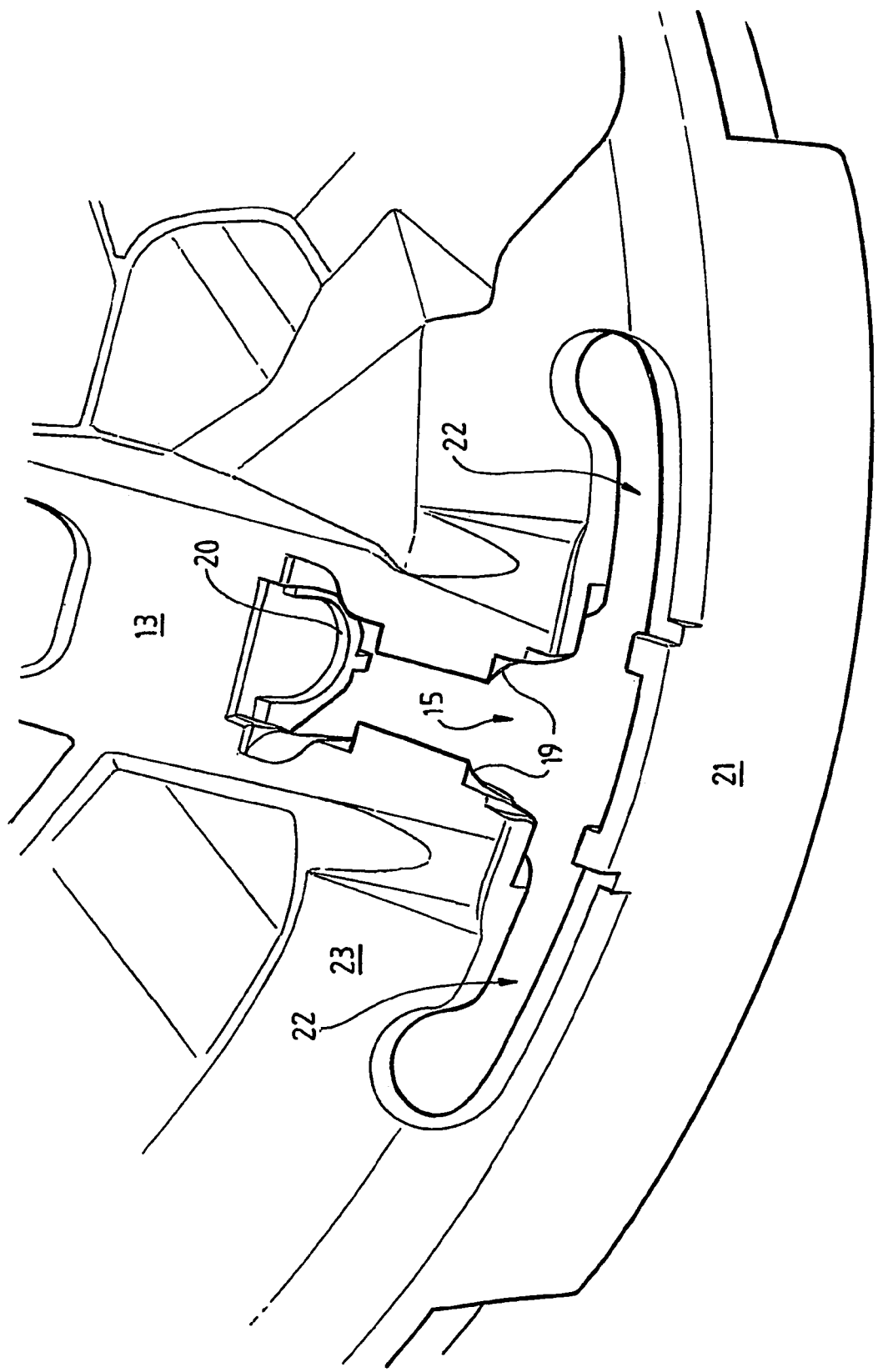
FIG. 3 shows an enlarged view of a socket in accordance with this embodiment.

Referring to FIG. 2, the cylindrical heads 14 have chamfered ends 17 that are used to assist in location of the cylindrical head 14 in to the socket. Referring to FIG. 3, the socket 15 is a generally elongate aperture within the moulding of the cover plate 13. It is designed to retain the cylindrical head 14 while at the same time providing for rotation of the cylindrical head 14 within the socket 15.

The socket 15 comprises an opening in the cover plate with first surfaces 19 located on either side of the socket 15. The surfaces 19 prevent the cylindrical head from passing through the opening of the socket 15. The second surfaces 20 are provided at either end of the socket 15 and each comprise a recess with a U-shaped ledge that is diametrically opposed to the surfaces 19.

Once the cylindrical head is located within the socket, the surfaces 19 and 20 provide bearing support that enables rotation of the cylindrical head 14 within the socket 15.

The outer wall 21 of the cover plate 13 is designed to be flexible. It is of a generally thin section and there is provided an elongate aperture 22 extending either side of the socket 15 so that the outer wall 21 is not attached to the upper surface 23 of the cover plate 13. This enables the outer wall 21 to flex outwardly during insertion of the cylindrical head 14.

The pivoting joint is assembled by locating the first end of the cylindrical head 14 into one of the recesses formed by a surface 20. In this position, the longitudinal axis of the cylindrical head 14 is in an angle with respect to the longitudinal axis of the socket 15. The chamfered surface 17 acts to lead the other end of the cylindrical head 14 into its respective recess formed by surface 20. This is assisted by a small amount of flexing of the outer wall 21. The cylindrical head 14 snaps into location within the socket 15 so that surfaces 19 and 20 are in bearing contact with the cylindrical head 14.

Once in location, the resultant pivot joint is not easily disconnected. This is due to the support provided by surfaces 20 and 19. However, the pivotal joint is easily assembled as described above.

The claims defining the invention are as follow:
1. A motor mechanism (10) comprising:
a cover plate (13) including a socket (15) having an opening in said cover plate (13) with first surfaces (19) located on either side of said socket (15) and second surfaces (20) defining U-shaped recesses at either end of said socket (15) and diametrically opposing said first surfaces (19), said opening being an elongated slot which is formed in said cover plate (13) and separates said first surfaces (19) as well as said second surfaces (20), and said cover plate (13) including an elongated aperture (22) which is formed in said cover plate (13) transverse to and at one of said ends of said socket (15) to form a resiliently flexible portion (21), said elongated aperture (22) extending beyond said first surfaces (19) of said socket (15);
a cylindrical head (14) pivotally engagable within said socket (15), said cylindrical head (14) having a chamfered ends (17) to facilitate engagement of said cylindrical head (14) by said first (19) and second (20) surfaces of said socket (15), with said flexible portion (21) flexing outwardly during insertion of said cylindrical head (14) into said socket (15); and a rack (11) extending out of said cylindrical head (14), said rack (11) being pivotal with respect to said cover plate (13) as said cover plate (13) moves with respect to said motor mechanism (10).

2. A motor mechanism according to claim 1 wherein said first surface comprises a surface that restrains said cylindrical head within said U shaped recesses.

3. A motor mechanism according to claim 2 wherein a portion of said socket is resiliently flexible to allow insertion of said cylindrical head due to said resiliently flexible portion deflecting sufficiently to allow insertion of said cylindrical head into said second surfaces.

4. A motor mechanism according to claim 3 wherein said cover plate is pivotally connected to a second member, wherein said cylindrical head has attached said rack that is used to control movement of said cover plate with respect to said second member.

5. A motor mechanism according to claim 4 wherein said rack is a gear toothed rack that operatively engages said motor mechanism in said second member.

6. A motor mechanism according to claim 5 wherein said second surfaces are located at ends of said socket.

* * * * *